(12) United States Patent
Tajima

(10) Patent No.: US 8,662,725 B2
(45) Date of Patent: Mar. 4, 2014

(54) ACTUATOR

(75) Inventor: Keiichi Tajima, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 307 days.

(21) Appl. No.: 13/008,067

(22) Filed: Jan. 18, 2011

(65) Prior Publication Data

US 2011/0188258 A1    Aug. 4, 2011

(30) Foreign Application Priority Data

Feb. 2, 2010   (JP) .................................. 2010-021353

(51) Int. Cl.
*F21V 21/14*    (2006.01)
(52) U.S. Cl.
USPC ............................. 362/530; 362/523; 362/524
(58) Field of Classification Search
USPC ................. 362/282–287, 459, 464–466, 473, 362/475–478, 507, 508, 523–526, 528, 530, 362/546
See application file for complete search history.

(56) References Cited

U.S. PATENT DOCUMENTS

| 7,315,127 B2* | 1/2008 | Tajima | 315/82 |
| 7,364,331 B2* | 4/2008 | Tajima | 362/509 |
| 7,621,663 B2* | 11/2009 | Tajima et al. | 362/530 |

FOREIGN PATENT DOCUMENTS

| JP | 2007-128856 A | 5/2007 |
| JP | 2008-94275 A | 4/2008 |
| JP | 2008-123855 A | 5/2008 |
| JP | 2010135119 A | 6/2010 |

OTHER PUBLICATIONS

Japanese Office Action issued Nov. 12, 2013 in Japanese Patent Application No. 2010-021353.

* cited by examiner

*Primary Examiner* — Hargobind S Sawhney
(74) *Attorney, Agent, or Firm* — Sughrue Mion, PLLC

(57) ABSTRACT

Into a case member, either of a unidirectional adjusting device for adjusting an irradiating direction of light only in a vertical direction by tilting a lamp unit in the vertical direction or a bidirectional adjusting device for adjusting the irradiating direction of light in two directions of the vertical direction and a horizontal direction by tilting the lamp unit in the vertical direction and rotating the lamp unit in the horizontal direction can be installed.

6 Claims, 7 Drawing Sheets

ACTUATOR

BACKGROUND OF THE INVENTION

1. Field of the Invention

The present invention relates to an actuator. More particularly, the present invention relates to an actuator in which either a unidirectional adjusting device for adjusting an irradiating direction of light from a light source of a lamp unit in a single direction or a bidirectional adjusting device for adjusting the irradiating direction in two directions is selectively installed, so as to ensure a versatility of the actuator without causing an increase in manufacturing costs thereof.

2. Related Art

In vehicle headlamps, there are, for example, vehicle headlamps in which a lamp unit having a light source and a reflector for reflecting light from the light source is disposed in an interior of a lamp casing which is made up of a cover and a lamp housing.

In these vehicle headlamps, there is a vehicle headlamp of a type in which the lamp unit is supported rotatably (or in a tilting fashion) on a support member such as a frame or a bracket so that the lamp unit is rotated by virtue of driving force of an actuator (refer to Patent Documents 1 to 3, for example).

[Patent Document 1] JP-A-2007-128856
[Patent Document 2] JP-A-2008-094275
[Patent Document 3] JP-A-2008-123855

In the vehicle headlamp of the type, a so-called leveling adjustment (a leveling operation) is performed in which a deviation of an optical axis of the lamp unit is adjusted by rotating (tilting) the lamp unit in a vertical direction by the actuator when the optical axis of the lamp unit changes to deviate from a predetermined level due to a weight of a load on a vehicle. In addition, a so-called swiveling adjustment (a swiveling operation) is performed in which the direction of the optical axis of the lamp unit is changed so as to follow a traveling direction of the vehicle.

However, there are some vehicle headlamps which do not need a swiveling adjustment function but need a leveling adjustment function only.

In this case, in the event that the actuator which has both the swiveling adjustment function and the leveling adjustment function is used, a structure for an unnecessary function becomes wasteful, eventually calling for an increase in manufacturing costs of the actuator.

On the other hand, in the event that an actuator having only a leveling adjustment function is fabricated, the actuator cannot be adapted to a vehicle headlamp which needs both the swiveling adjustment function and the leveling adjustment function. To complete such vehicle headlamp, a structure exclusive to the leveling adjustment is needed separately, which increases the manufacturing costs accordingly and makes it impossible to ensure the versatility of the actuator.

SUMMARY OF THE INVENTION

One or more embodiments of the invention provide an actuator which can ensure a versatility without calling for an increase in manufacturing costs.

In accordance with one or more embodiments of the invention, an actuator 23 is configured to adjust an irradiating direction of light from a light source of a lamp unit 10 which is disposed in an interior of a lamp casing 4 made up of a lamp housing 2 which is opened in one direction and a cover 3 which closes the opening of the lamp housing 2, and the actuator 23 is provided with a case member 24. Either a unidirectional adjusting device 34 or a bidirectional adjusting device 34, 35 is selectively installed in the case member 24. The unidirectional adjusting device 34 is configured to adjust the irradiating direction only in a vertical direction by tilting the lamp unit 10 in the vertical direction. The bidirectional adjusting device 34, 35 is configured to adjust the irradiating direction in both of the vertical direction and a horizontal direction by tilting the lamp unit 10 in the vertical direction and rotating the lamp unit 10 in the horizontal direction. A mounting shaft 30 is provided in the case member 24. The unidirectional adjusting device 34 includes an outputting connection member 36 which is connected to the lamp unit 10 and which can be mounted on the mounting shaft 30 of the case member 24. A restricting portion 42 configured to restrict a horizontal rotation of the outputting connection member 36 relative to the lamp housing 2 is provided.

Other aspects and advantages of the invention will be apparent from the following description and the appended claims.

DETAILED DESCRIPTION OF THE EXEMPLARY EMBODIMENTS

An exemplary embodiment of the invention is described by reference to the accompanying drawings (refer to FIGS. 1 to 7).

A vehicle headlamp 1 is mounted to be disposed at each of left and right end portions of a front end portion of a vehicle body.

Figure 1:
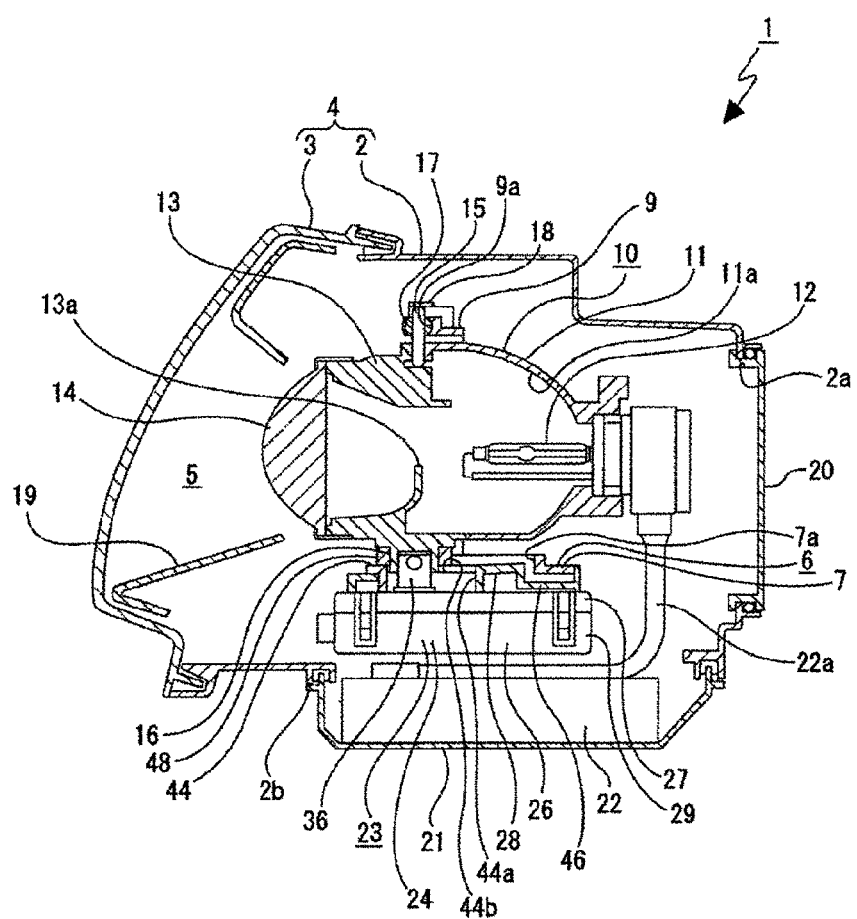
FIG. 1 is a schematic vertical sectional view of a vehicle headlamp which shows an exemplary embodiment of the invention.

As is shown in FIG. 1, the vehicle headlamp 1 includes a lamp housing 2 having a recess portion which is opened to the front and a cover 3 which closes an open side of the lamp housing 2. A lamp casing 4 is made up of the lamp housing 2 and the cover 3, and an interior space of the lamp casing 4 is formed as a lamp compartment 5.

A mounting opening 2a is formed in a rear end portion of the lamp housing 2 so as to penetrate therethrough in a front-rear direction. A disposing opening 2b is formed in a lower end portion of the lamp housing 2 so as to penetrate therethrough in a vertical direction.

Figure 2:
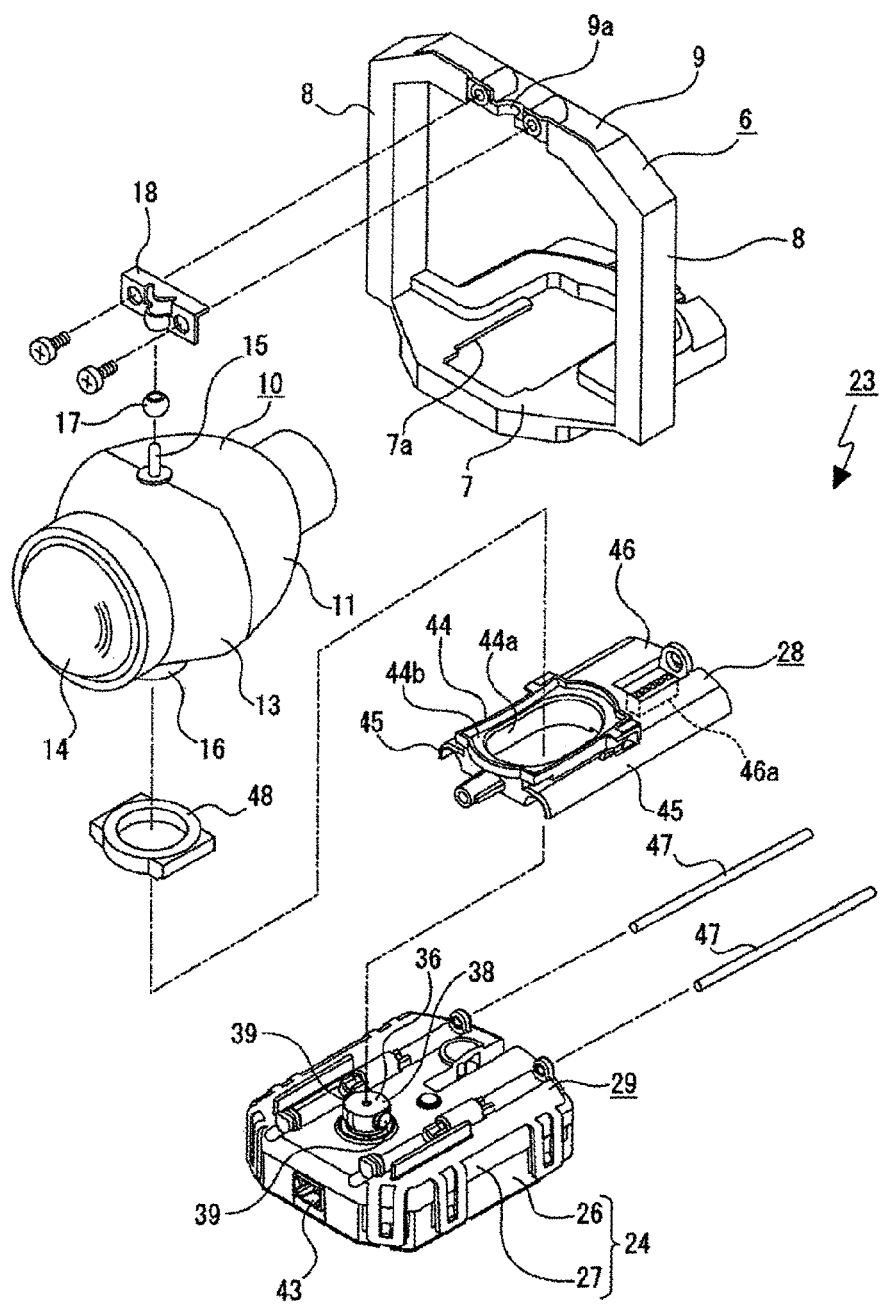
FIG. 2 is an exploded perspective view of the vehicle headlamp with part of an interior configuration omitted.

A support member 6 is disposed in the lamp compartment 5. The support member 6 is supported in the lamp housing so as to tilt in a left-right direction (a horizontal direction) and an up-down direction (a vertical direction) by an aiming adjusting mechanism, not shown. As is shown in FIGS. 1 and 2, the support member 6 is made up of a base portion 7 which is oriented in the vertical direction, pillar portions 8, 8 which project upwards from both left and right end portions of the base portion 7 and an overhang portion 9 which connects between upper end portions of the pillar portions 8, 8. A supporting catch portion 9a is formed at a transversely central portion of the overhang portion 9.

A mounting hole 7a is formed in the base portion 7 so as to penetrate therethrough in the vertical direction.

A lamp unit 10 is disposed in the lamp compartment 5 (refer to FIG. 1). The lamp unit 10 is supported on the support member 6 so as to tilt in the vertical direction and rotate in the horizontal direction.

As is shown in FIGS. 1 and 2, the lamp unit 10 has a reflector 11 which reflects light on an inner surface thereof, a light source 12 which is held at a rear end portion of the reflector 11, a lens holder 13 which is mounted at a front end of the reflector 11 and a projection lens 14 which is held at a front end portion of the lens holder 13.

The reflector 11 is formed into a cut-like shape which is opened to the front, and an inner surface thereof is formed as a reflecting surface 11a. The reflecting surface 11a is formed into a parabolic surface or an elliptical surface.

A shade 13a is provided on the lens holder 13. The shade 13a is provided so as to project into an interior of the lamp unit 10. The shade 13a has a function to cut off part of light emitted from the light source 12.

For example, a discharge lamp is used as the light source 12.

The lamp unit 10 is supported so as to rotate in the horizontal direction (the left-right direction) on pivot shafts 15, 16 as fulcrums which are provided at both upper and lower end portions of the lens holder 13, respectively, so as to be positioned apart from each other in the vertical direction.

The pivot shaft 15 is connected to a spherical portion 17, and the spherical portion 17 is supported at the supporting catch portion 9a of the overhang portion 9 by being fastened by a fastening member 18 mounted on the overhang portion 9 of the support member 6 with screws.

The lamp unit 10 is made to tilt in the vertical direction on the spherical portion 17 as a fulcrum by the pivot shaft 16 moving in a front-rear direction (a longitudinal direction).

An extension 19 is disposed at front end side of the lamp compartment 5 so as to shield part of the lamp unit 10 (refer to FIG. 1).

A back cover 20 is mounted at the rear end portion of the lamp housing 2 so as to close the mounting opening 2a.

A mounting cover 21 is mounted at the lower end portion of the lamp housing 2 to close the disposing opening 2b. The mounting cover 21 is formed into a box-like shape which is opened upwards.

A discharge lamp igniting or lighting device 22 is mounted in an interior of the mounting cover 21. The discharge lamp lighting device 22 is a device for lighting the light source 12 and has a lighting circuit in the interior thereof.

The discharge lamp lighting device 22 is connected to the light source 12 by a cable 22a, and the cable 22a is laid to extend downwards from a rear of the lamp unit 10.

An actuator 23 is disposed on a lower side of the lamp unit 10. The actuator 23 has a case member 24 and a drive mechanism 25 which is disposed in the case member 24 (refer to FIGS. 2 and 3).

The case member 24 is made up of a box-shaped disposing case 26 and a lid member 27 which closes the disposing case 26. A support portion 28 is disposed on an upper side of the lid member 27. A main body portion 29 is made up of the case member 24 and the drive mechanism 25, and the main body portion 29 is supported on the support member 28 so as to move in the longitudinal direction.

Figure 3:
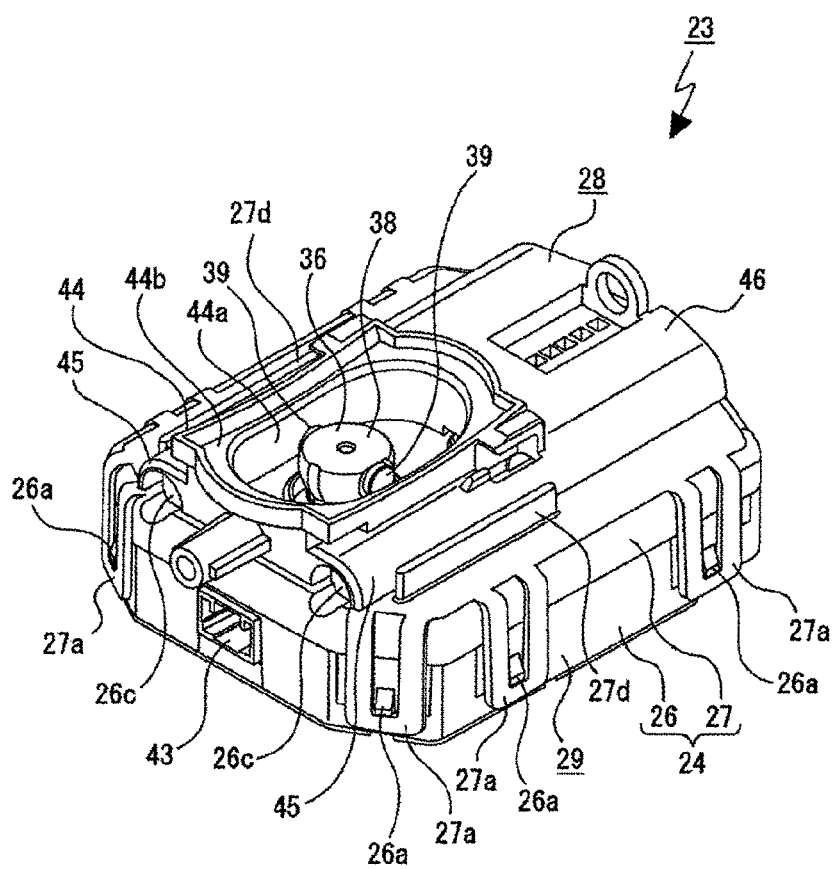
FIG. 3 is a perspective view of an actuator.
Figure 4:
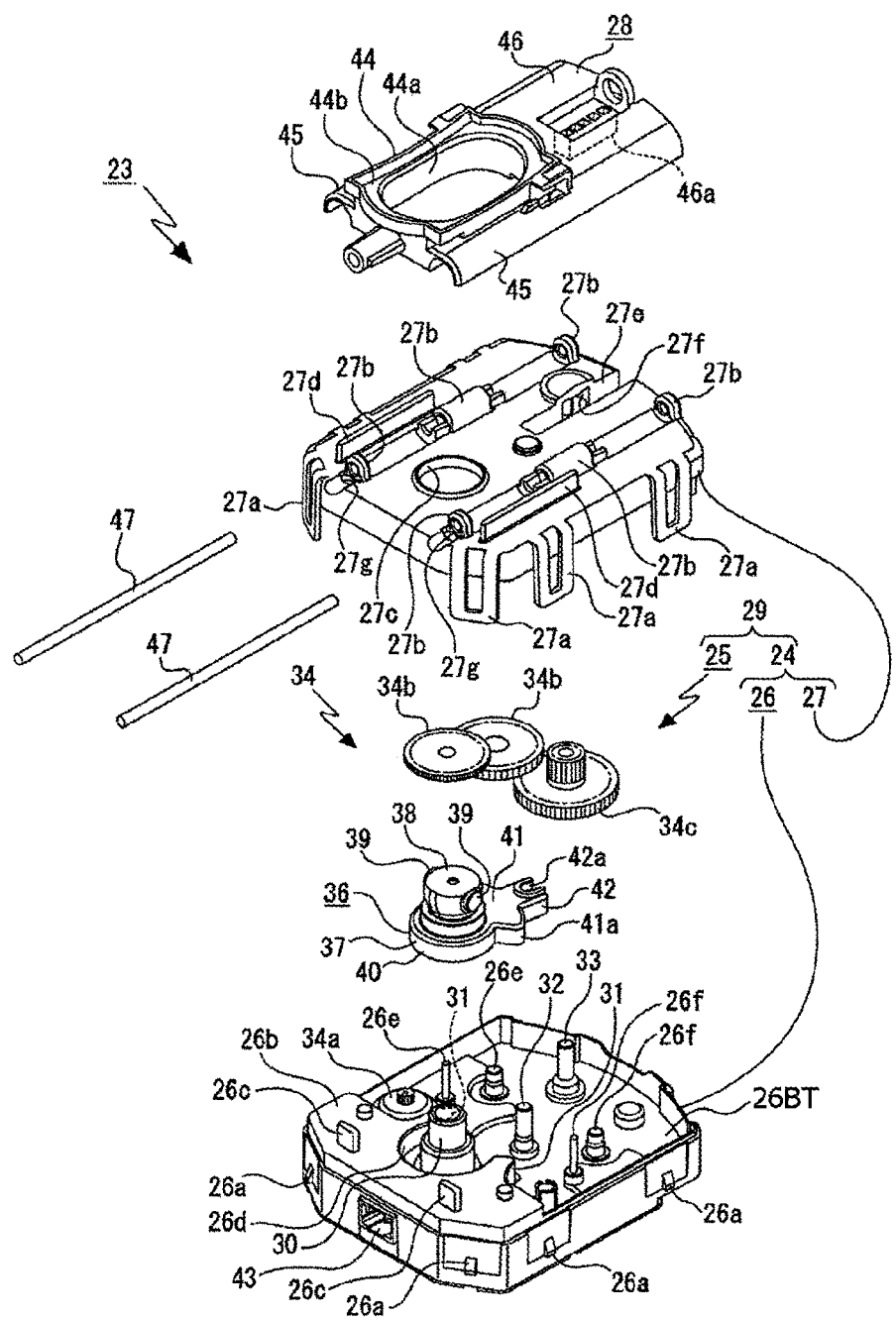
FIG. 4 is an exploded perspective view of the actuator when a swiveling mechanism is not installed but a leveling mechanism is installed.

A plurality of locking projecting portions 26a, 26a, . . . are provided on an outer circumferential surface of the disposing case 26 so as to be disposed at intervals in a circumferential direction (refer to FIGS. 3 and 4). An upper surface of a front end portion of the disposing case 26 is closed by a flat surface portion 26b, and stopper projecting portions 26c, 26c are provided on the flat surface portion 26b so as to be spaced apart from each other in the transverse direction (refer to FIGS. 4 and 5). The stopper projecting portions 26c, 26c projects upwards from the flat surface portion 26b.

A mounting shaft 30 is provided at a transversely central portion of the disposing case 26 so as to project upwards from a bottom 26BT of the disposing case 26. A peripheral portion of the mounting shaft 30 is formed as an inserting recess portion 26d which is opened upwards.

Positioning projecting portions 31, 31 are provided individually in positions lying on left- and right-hand sides of the mounting shaft 30. The positioning projecting portions 31, 31 connect to the flat surface portion 26 and project rearwards.

A first gear supporting shaft 32 and a second gear supporting shaft 33 are provided rearwards of the mounting shaft 30 so as to be spaced apart from each other in the longitudinal direction in the disposing case 26. The first and second gear supporting shafts 32, 33 project upwards from the bottom 26BT.

Pivot shafts 26e, 26e are provided in positions on a right-hand side of the disposing case 26 so as to be spaced apart from each other in the longitudinal direction, while pivot shafts 26f, 26f are provided in positions on a left-hand side of the disposing case 26 so as to be spaced apart from each other in the longitudinal direction. The pivot shafts 26e, 26e, 26f, 26f individually project upwards.

The lid member 27 is formed into a shallow box-like shape which is opened downwards. A plurality of locking pieces 27a, 27a, . . . are provided on an outer circumferential surface of the lid member 27 so as to project downwards. Locking holes are formed individually in the locking pieces 27a, 27a, . . . .

A plurality of bearing portions 27b, 27b, . . . are provided on an upper surface of the lid member 27 so as to be spaced apart in the transverse direction. For example, three bearing portions 27b are provided on each longitudinal side of the upper surface of the lid member 27 so as to be positioned apart from one another in the longitudinal direction.

An inserting hole 27c is formed in a position lying closer to a front end of the lid member 27 so as to penetrate therethrough in the vertical direction. Positioning wall portions 27d, 27d are provided transversely outwards of the respective lines of bearing portions 27b, 27b, . . . on the upper surface of the lid member 27.

A disposing groove 27e is formed at a rear end portion of the lid member 27. The disposing groove 27e penetrates the lid member 27 in the vertical direction and extends rearwards. An inserting groove 27f is formed in a wall portion which defines the disposing groove 27e. The inserting groove 27f penetrates through the wall portion in the transverse direction and is opened downwards.

Projecting portion inserting holes 27g, 27g are formed in a front end portion of the lid member 27 in positions lying just in front of the bearing portions 27, 27 which make frontmost bearing portions of the respective lines of bearing portions 27, 27, . . . . The projecting portion inserting holes 27g, 27g penetrate through the front end portion of the lid member 27 in the vertical direction.

The drive mechanism 25 is configured in accordance with the type of the vehicle headlamp 1 and is made up of a leveling mechanism 34 or both the leveling mechanism 34 and a swiveling mechanism 35 (refer to FIGS. 4 to 7).

The leveling mechanism 34 functions as a unidirectional adjusting device which can adjust an irradiating direction of light only in a vertical direction by tilting the lamp unit 10 in the vertical direction. An overall mechanism made up of the leveling mechanism 34 and the swiveling mechanism 35 functions as a bidirectional adjusting device which can adjust the irradiating direction of light in the vertical direction and in the horizontal direction by tilting the lamp unit 10 in the vertical direction or rotating the lamp 10 in the horizontal direction.

Depending upon the type of the vehicle headlamp 1, the leveling mechanism 34 and the swiveling mechanism 35 are provided in the actuator 23. Namely, for an actuator 23 for use in a vehicle headlamp 1 in which no swiveling adjustment is performed, only the leveling mechanism 34 is disposed in the disposing case 26. For an actuator 23 for use in a vehicle headlamp 1 in which both the leveling adjustment and the swiveling adjustment are performed, the leveling mechanism 34 and the swiveling mechanism 35 are disposed in the disposing case 26.

Figure 5:
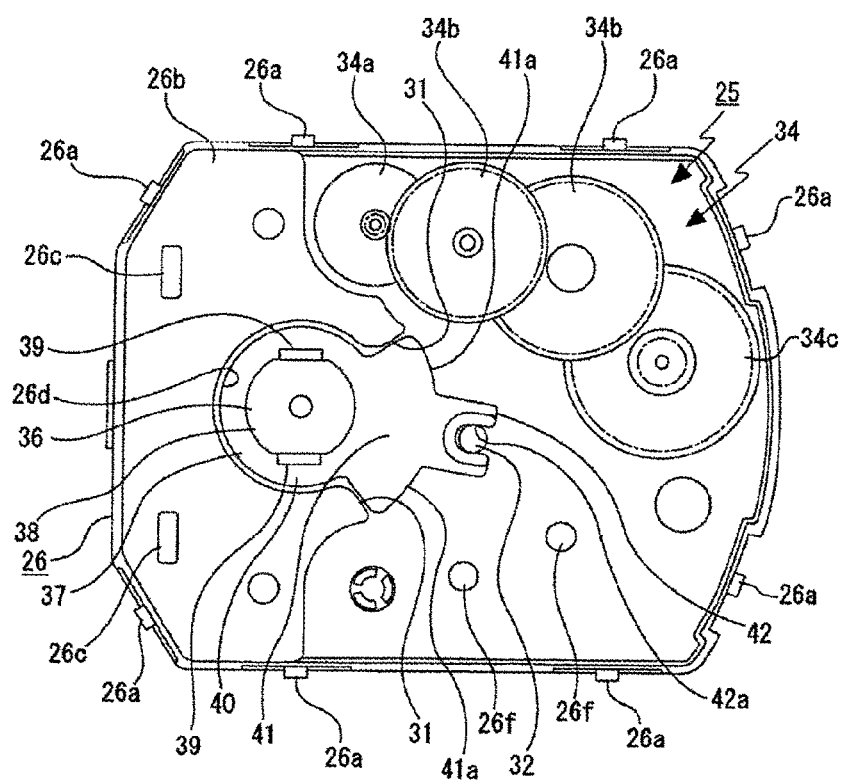
FIG. 5 is an enlarged plan view showing a state in which the swiveling mechanism is not installed but the leveling mechanism is installed.
Figure 6:
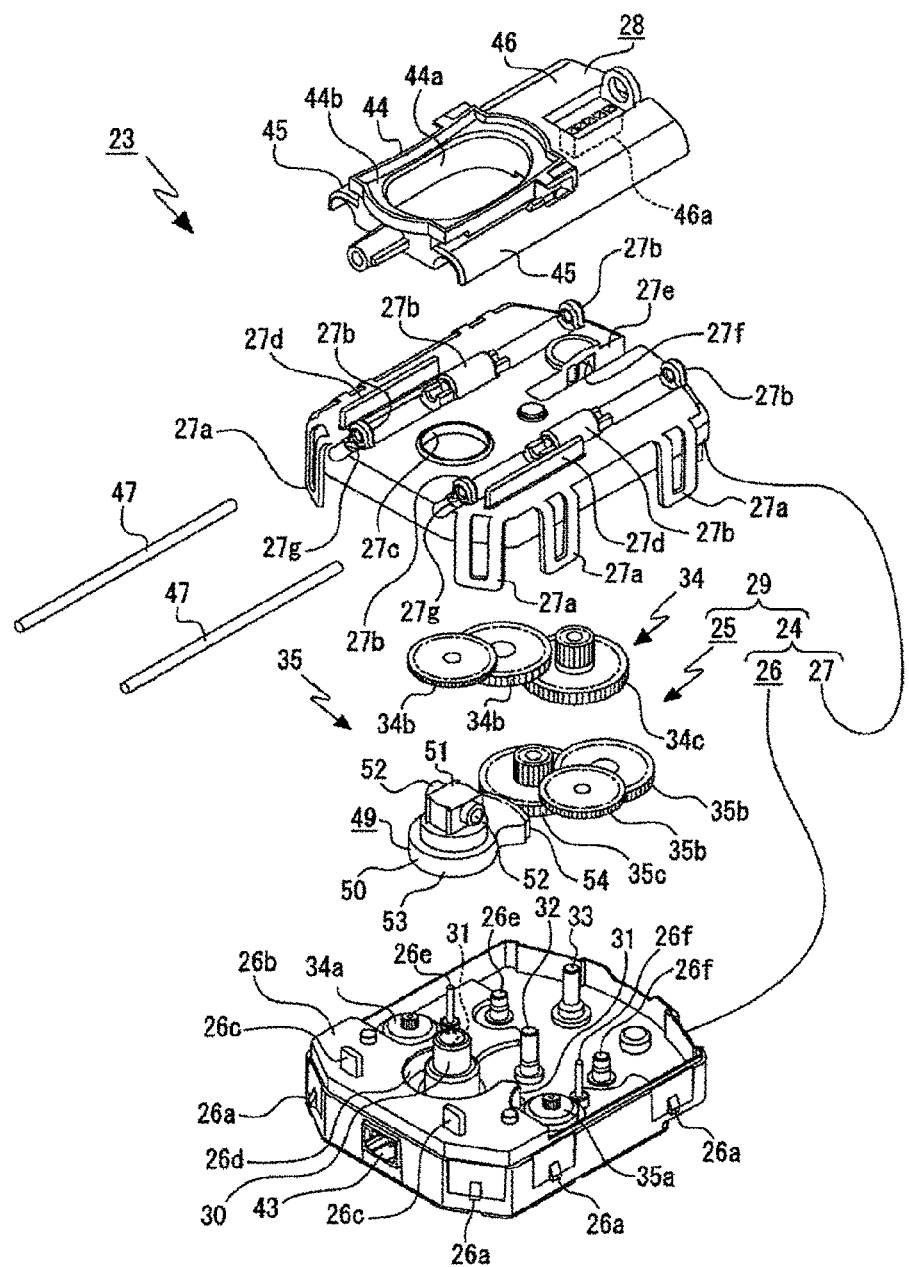
FIG. 6 is an exploded perspective view of the actuator when the leveling mechanism and the swiveling mechanism are installed.
Figure 7:
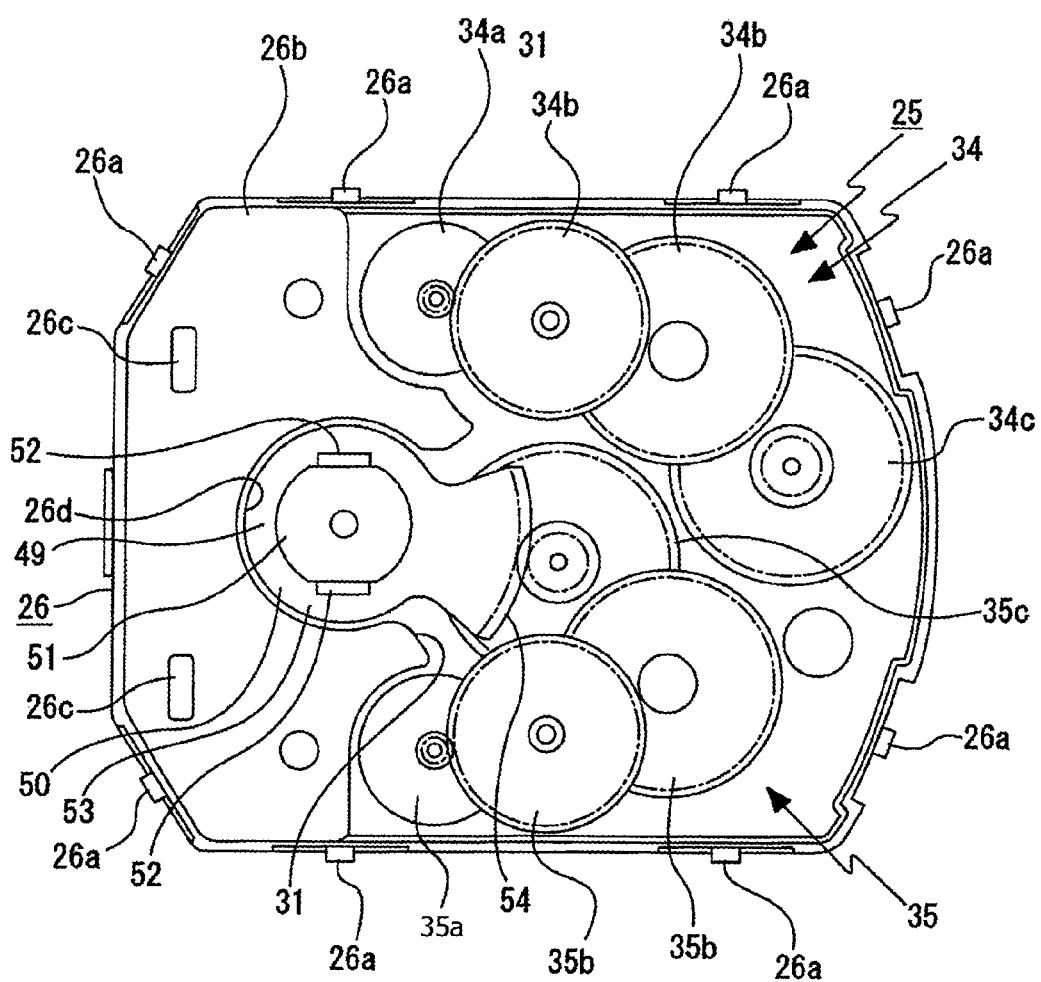
FIG. 7 is an enlarged plan view showing a state in which the leveling mechanism and the swiveling mechanism are installed.

As is shown in FIGS. 4 and 5, the leveling mechanism 34 has a leveling motor 34a, reduction gears 34b, 34b which are rotated by virtue of driving force of the leveling motor 34a and a pinion gear 34c which is rotated by the driving force of the leveling motor 34a which is transmitted to the pinion gear 34c via the reduction gears 34b, 34b. The leveling motor 34a, the reduction gears 34b, 34b and the pinion gear 34c are disposed in the disposing case 26.

The reduction gears 34b, 34b are supported on the pivot shafts 26e, 26e, respectively, and the pinion gear 34c is supported on the second gear supporting shaft 33.

The leveling mechanism 34 has an outputting connection member 36. The outputting connection member 36 is made up of a base portion 37, a connecting shaft portion 38 which projects upwards from the base portion 37 and anti-rotation projections 39, 39 which project in opposite directions from an outer circumferential surface of the connecting shaft portion 38. These constituent components are integrated into the outputting connection member 36.

The base portion 37 is made up of a circular disk portion 40, an intermediate portion 41 which connects to a rear end of the circular disk portion 40 and a restricting portion 42 which projects rearwards from the intermediate portion 41. The connecting shaft portion 38 projects upwards from the circular disk portion 40.

Positioning portions 41a, 41a are provided on the intermediate portion 41 so as to project leftwards and rightwards therefrom. The positioning projecting portions 41a, 41a each have a substantially triangular shape which narrows or tapers in width as it extends outwards.

An engagement groove 42a is formed in the restricting portion 42. The engagement groove 42a is opened rearwards and penetrates through the restricting portion 42 in the vertical direction.

The outputting connection member 36 is disposed in the disposing case 26 in such a state that the circular disk portion 40 of the base portion 37 and the connecting shaft portion 38 are supported on the mounting shaft 30 and the first gear supporting shaft 32 is inserted in the engagement groove 42a in the restricting portion 42. As this occurs, the outputting connection member 36 is positioned in the disposing case 26 so that the positioning portions 41a, 41a are positioned along the positioning projecting portions 31, 31, respectively.

The outputting connection member 36 is made not to rotate relative to the disposing case 26 by the first gear supporting shaft 32 being inserted into the engagement groove 42a in the restricting portion 42.

A circuit board, not shown, is disposed in an interior of the disposing case 26, and a connector 43 is provided at a front end portion of the circuit board.

The support portion 28 of the actuator 23 is made up of a thrust bearing 44 which bears the load of the lamp unit 10, shaft support portions 45, 45 which are provided so as to connect to left- and right-hand sides of the thrust bearing 44, respectively, and a connecting portion 46 which is provided so as to connect to a rear side of the trust bearing 44 and to inner sides of rear end portions of the shaft support portions 45, 45. These constituent components are integrated into the support portion 28.

The thrust bearing 44 is formed into a substantially rectangular shape which is elongated in the longitudinal direction and has a shaft inserting hole 44a which penetrates the support portion 28 in the vertical direction and which is elongated in the longitudinal direction. An upper opening edge of the shaft inserting hole 44a of the thrust bearing 44 is made into a sliding surface 44b which is formed into a moderate arc-shaped surface which is concave downwards.

The shaft support portions 45, 45 are formed long in the longitudinal direction. A plurality of shaft holding portions, not shown, are provided on a lower side of each of the shaft support portions 45, 45 so as to be spaced apart from each other in the longitudinal direction.

A rack 46a is provided on a lower surface side of the connecting portion 46. The rack 46a projects downwards and extends in the longitudinal direction.

The support portion 28 of the actuator 23 is disposed on an upper side of the lid member 27 and the rack 46a is inserted into the disposing groove 27e in the lid member 27.

In such a state that the support portion 28 is disposed on the upper side of the lid member 27, guide shafts 47, 47 are inserted into the bearing portions 27b, 27b, . . . of the lid member 27 and the shaft support portions 45, 45 of the support portion 28 from the front.

The lid member 27 is joined to the disposing case 26 by the locking pieces 27a, 27a, . . . being locked on the corresponding locking projecting portions 26a, 26a, . . . .

In such a state that the lid member 27 is joined to the disposing case 26, the connecting shaft portion 38 and the anti-rotation projections 39, 39 of the outputting connection member 36 are allowed to project upwards from the inserting hole 27c in the lid member 27 and the connecting shaft portion 38 and the anti-rotation projections 39, 39 are disposed in the shaft inserting hole 44a formed in the thrust bearing 44 of the support portion 28.

In such a state that the lid member 27 is joined to the disposing case 26, part of the pinion gear 34c of the leveling mechanism 34 projects into the disposing groove 27e from the inserting groove 27f. Consequently, the pinion gear 34c is brought into meshing engagement with the rack 46a of the support portion 28 which is inserted into the disposing groove 27e.

When the lid member 27 is joined to the disposing case 26, the stopper projecting portions 26c, 26c which are provided on the flat surface portion 26b of the disposing case 26 are inserted into the corresponding projecting portion inserting holes 27g, 27g in the lid member 27 from therebelow and are then positioned to be in abutment with or lying closely to front end faces of the guide shafts 47, 47, whereby the guide shafts 47, 47 are restricted from moving forwards by the corresponding stopper projecting portions 26c, 26c.

In the actuator 23, the main body portion 29 which has the disposing case 26 and the lid member 27 is supported on the support portion 28 so as to move in the longitudinal direction via the guide shafts 47, 47.

The support portion 28 is inserted into the mounting hole 7a in the support member 6 from therebelow, whereby the actuator 23 is mounted on the support member 6 with an appropriate device.

The pivot shaft 16 of the lamp unit 10 is inserted into a washer 48. A lower surface of the washer 48 is formed into a moderate arc-shaped surface which is concave downwards so as to match the sliding surface 44b of the thrust bearing 44.

In such a state that the actuator 23 is mounted on the support member 6, the lower pivot shaft 16 of the lamp unit 10 is connected to the connecting shaft portion 38 and the anti-rotation projections 39, 39 with the pivot shaft 16 inserted in the washer 48. The lamp unit 10 is made not to rotate relative to the outputting connection member 36 by the anti-rotation projections 39, 39.

In such a state that the pivot shaft 16 is connected to the outputting connection member 36, a lower surface of the washer 48 is allowed to slide on the sliding surface 44b of the thrust bearing 44 of the actuator 23.

In such a state that the lamp unit 10 is connected to the actuator 23 in the way described above, when the leveling motor 34a is energized via the connector 43 from a power supply circuitry, not shown, to thereby be rotated, the driving force of the leveling motor 34a is transmitted to the rack 46a via the pinion gear 34c. When the driving force of the leveling motor 34a is transmitted to the rack 46a, the main body portion 29 is moved in the longitudinal direction relative to the support portion 28 in accordance with a rotating direction of the leveling motor while being guided by the guide shafts 47, 47. Then, in association with the movement of the main body portion 29, the lamp unit 10 is tilted in the vertical direction on the spherical portion 17 as the fulcrum so as to perform the leveling operation.

The swiveling mechanism 35 has a swiveling motor 35a, reduction gears 35b, 35b which are rotated by driving force of the swiveling motor 35a and a transmission gear 35c which is rotated by virtue of the driving force of the swiveling motor 35a which is transmitted thereto.

The reduction gears 35b, 35b are supported on the pivot shafts 26f, 26f, respectively. The transmission gear 35c is supported on the first pivot shaft 32.

The swiveling mechanism 35 has a joining connection member 49. The joining connection member 49 is made up of a base portion 50, a connecting shaft portion 51 which projects upwards from the base portion 50 and anti-rotation projections 52, 52 which project in opposite directions from an outer circumferential surface of the connecting shaft portion 51. These constituent components are formed integrally, for example.

The base portion 50 is made up of a circular disk portion 53 and a gear portion 54 which projects rearwards from the circular disk portion 53. The connecting shaft portion 51 projects upwards from the circular disk portion 53.

The joining connection member 49 is disposed in the disposing case 26 in such a state that the circular disk portion 53 of the base portion 50 and the connecting shaft portion 51 are supported on the mounting shaft 30 and the gear portion 54 is brought into meshing engagement with the transmission gear 35c.

When the joining connection member 49 is supported on the mounting shaft 30, the outputting connection member 36 of the leveling mechanism 34 is removed from the mounting shaft 30. The joining connection member 49 is supported rotatably on the mounting shaft 30.

In such a state that the lid member 27 is joined to the disposing case 26, the connecting shaft portion 51 and the anti-rotation projections 52, 52 of the joining connection member 49 are allowed to project upwards from the inserting hole 27c in the lid member 27. The connecting shaft portion 51 and the anti-rotation projections 52, 52 are disposed in the shaft inserting hole 44a formed in the thrust bearing 44 of the support portion 28.

In such a state that the actuator 23 is mounted on the support member 6, the lower pivot shaft 16 of the lamp unit 10 is connected to the connecting shaft portion 51 and the anti-rotation projections 52, 52 of the joining connection member 49 with the pivot shaft 16 inserted into the washer 48. The lamp unit 10 is made not to rotate relative to the joining connection member 49 by the anti-rotation projections 52, 52.

In such a state that the pivot shaft 16 is connected to the joining connection member 49, the lower surface of the washer 48 is allowed to slide on the sliding surface 44b of the thrust bearing 44 of the actuator 23.

In such a state that the lamp unit 10 is connected to the actuator 23 in the way described above, when the swiveling motor 35a is energized to rotate via the connector 43 from the power supply circuitry, not shown, the driving force of the swiveling motor 35a is transmitted to the lamp unit 10 via the transmission gear 35c and the joining connection member 49, the lamp unit 10 is rotated in the horizontal direction in accordance with a rotating direction of the swiveling motor 35a on the pivot shafts 15, 16 as fulcrums, whereby the swiveling operation is performed.

When the swiveling operation is performed, the lamp unit 10 is rotated in the horizontal direction in accordance with a traveling direction of the vehicle, whereby light emitted from the light source 12 is shone so as to follow the traveling direction of the vehicle.

When the swiveling mechanism 35 is provided in the actuator 23, the leveling mechanism 34 is also provided with the outputting connection member 36 removed, the leveling operation can also be performed in addition to the swiveling operation.

As has been described heretofore, in the actuator 23, since the swiveling mechanism 35 is installed in accordance with the type of the vehicle headlamp 1, the actuator 23 is adapted to both a vehicle headlamp 1 which needs the leveling adjustment mechanism only and a vehicle headlamp 1 which needs both the swiveling adjustment function and the leveling adjustment function, thereby making it possible to ensure the versatility thereof without calling for an increase in manufacturing costs.

When the swiveling mechanism 35 is not disposed in the support member 24, the restricting portion 42 of the outputting connection member 36 is brought into engagement with the first pivot shaft 32, whereby the horizontal rotation of the outputting connection member 36 relative to the lamp housing 2 is restricted.

Consequently, in the vehicle headlamp 1 in which no swiveling adjustment is performed, the horizontal rotation of the lam unit 10 can be restricted with the simple configuration.

Since the restricting portion 42 is provided integrally on the outputting connecting member 36, a reduction in the number of components can be realized.

Since the positioning portions 41a, 41a are provided on the outputting connection member 36, the positioning of the outputting connection member 36 relative to the case member 24 can be facilitated, and when the outputting connection member 36 is so positioned, since the restricting portion 42 is brought into engagement with the first pivot shaft 32, the facilitation of assemblage of the outputting connection member 36 to the case member 24 can be realized.

The configurations and constructions of the respective portions described in the exemplary embodiment of the invention constitute only specific examples in carrying out the invention, and therefore, the technical scope of the invention should not be construed in a limited fashion based on the exemplified configurations and constructions in any way.

In accordance with the embodiments of the invention, an actuator 23 is configured to adjust an irradiating direction of light from a light source of a lamp unit 10 which is disposed in an interior of a lamp casing 4 made up of a lamp housing 2 which is opened in one direction and a cover 3 which closes the opening of the lamp housing 2. The actuator 23 is provided with a case member 24. Either a unidirectional adjusting device 34 or a bidirectional adjusting device 34, 35 is selectively installed in the case member 24. The unidirectional adjusting device 34 is configured to adjust the irradiating direction only in a vertical direction by tilting the lamp unit 10 in the vertical direction. The bidirectional adjusting device 34, 35 is configured to adjust the irradiating direction in both of the vertical direction and a horizontal direction by tilting the lamp unit 10 in the vertical direction and rotating the lamp unit 10 in the horizontal direction. A mounting shaft 30 is provided in the case member 24. The unidirectional adjusting device 34 includes an outputting connection member 36 which is connected to the lamp unit 10 and which can be mounted on the mounting shaft 30 of the case member 24. A restricting portion 42 configured to restrict a horizontal rotation of the outputting connection member 36 relative to the lamp housing 2 is provided.

Consequently, in the actuator, the horizontal rotation of the outputting connection member mounted on the mounting shaft of the case member relative to the lamp housing is restricted by the restricting portion.

Since the swiveling mechanism can be installed in the actuator depending upon a type of a vehicle headlamp, the actuator can be adapted to both a vehicle headlamp which needs only the unidirectional adjusting function and a vehicle headlamp which needs the bidirectional adjusting function, thereby making it possible to ensure the versatility thereof without calling for an increase in manufacturing costs.

In the above structure, the case member 24 may include a gear supporting shaft 32. The bidirectional adjusting device 34, 35 may include: a joining connection member 49 which can be mounted on the mounting shaft 30 and which has a gear portion 54; and a transmission gear 35c which can be mounted on the gear supporting shaft 32 and which is brought into meshing engagement with the gear portion 54 of the joining connection member 49. Either the outputting connection member 36 or the joining connection member 49 may be selectively mounted on the mounting shaft 30. When the outputting connection member 36 is mounted on the mounting shaft 30, the transmission gear 35c may not be mounted on the gear supporting shaft 32. When the outputting connection member 36 is mounted on the mounting shaft 30, the restricting portion 42 may be brought into engagement with the gear supporting shaft 32 so as to restrict the horizontal rotation of the outputting connection member 36 relative to the lamp housing 2.

Consequently, when the unidirectional adjusting device is disposed, the horizontal rotation of the lamp unit can be restricted by the simple configuration.

In the above structure, if the restricting portion is provided integrally on the outputting connection member, a reduction in the number of components can be realized.

In the above structure, if a positioning portion is provided on the outputting connection member in order to position the outputting connection member relative to the case member when the outputting connection member is mounted on the mounting shaft, the positioning of the outputting connection member relative to the case member can easily be effected.

Moreover, in accordance with the embodiments of the invention, a vehicle headlamp 1 may include: a support member 6; a lamp unit 10 supported on the support member 6 and movable with respect to the support member 6; and an actuator 23 arranged in a lower side of the lamp unit 10. The actuator 23 may include: a support portion 28 fixed on the support member 6 and unmovable with respect to the support member 6; and a main body portion 29 supported on the support portion 28 and slidable with respect to the support portion 28 in a front-rear direction. The main body portion 29 may include a leveling mechanism 34 and a disposing case 26. The disposing case 26 may include a bottom 26BT. A mounting shaft 30, a first supporting shaft 32, and a second supporting shaft 33 may respectively project upwards from the bottom 26BT of the disposing case 26. The leveling mechanism 34 may include: a leveling motor 34a disposed in the disposing case 26; a pinion gear 34c rotatably supported on the second supporting shaft 33 and configured to rotate by a driving force of the leveling motor 34a; and an outputting connection member 36 fitted on the mounting shaft 30 and unmovable with respect to the disposing case 26. A lower pivot shaft 16 of the lamp unit 10 may be connected to the outputting connection member 36 so that the lamp unit 10 is unrotatable with respect to the outputting connection member 36. The pinion gear 34c may be in meshing engagement with a rack 46a provided on the support portion 28. The lamp unit 10 may be configured to tilt in an up-down direction, when the leveling motor 34a rotates, the driving force of the leveling motor 34a is transmitted to the rack 46a through the pinion gear 34c, and the outputting connection member 36 moves with the main body portion 29 in the front-rear direction with respect to the support portion 28.

Furthermore, the outputting connection member 36 may include an engagement groove 42a. The outputting connection member 36 may be unmovably fixed with respect to the disposing case 26 by inserting the first supporting shaft 32 into the engagement groove 42a.

[Description of Reference Numerals and Signs]
2 lamp housing; 3 cover; 4 lamp casing; 10 lamp unit; 12 light source; 23 actuator; 24 case member; 30 mounting shaft; 32 first pivot shaft; 34 leveling mechanism; 35 swiveling mechanism; 35c transmission gear; 41a positioning portion; 42 restricting portion; 49 joining connection member; 54 gear portion.

What is claimed is:

1. An actuator configured to adjust an irradiating direction of light from a light source of a lamp unit which is disposed in an interior of a lamp casing made up of a lamp housing which is opened in one direction and a cover which closes the opening of the lamp housing, the actuator comprising:

a case member including a mounting shaft, a unidirectional adjusting device removably provided in the case member, the unidirectional adjusting device adjusting the irradiating direction only in a vertical direction by tilting the lamp unit in the vertical direction, wherein the unidirectional adjusting device includes an outputting connection member which is connected to the lamp unit and which is mounted on the mounting shaft of the case member, and wherein the output connection member includes a base portion and a connecting shaft portion, the base portion including a restricting portion that restricts a horizontal rotation of the outputting connection member relative to the lamp housing.

2. The actuator according to claim 1, wherein the restricting portion is integrally formed on the outputting connection member.

3. The actuator according to claim 1, wherein the case member further includes a positioning portion that positions the outputting connection member relative to the case member.

4. The actuator according to claim 1, wherein the restricting portion of the outputting connection member includes an engagement groove, and wherein the outputting connection member is unmovably fixed with respect to the case member by inserting a first supporting shaft of the case member into the engagement groove.

5. A vehicle headlamp comprising:

a support member;

a lamp unit supported on the support member and movable with respect to the support member; and an actuator arranged in a lower side of the lamp unit, wherein the actuator includes:

a support portion fixed on the support member and unmovable with respect to the support member; and a main body portion supported on the support portion and slidable with respect to the support portion in a front-rear direction, wherein the main body portion includes a leveling mechanism and a disposing case, wherein the disposing case includes a bottom, and wherein a mounting shaft, a first supporting shaft, and a second supporting shaft respectively project upwards from the bottom of the disposing case, wherein the leveling mechanism includes:

a leveling motor disposed in the disposing case;

a pinion gear rotatably supported on the second supporting shaft and configured to rotate by a driving force of the leveling motor; and an outputting connection member fitted on the mounting shaft and unmovable with respect to the disposing case, wherein a lower pivot shaft of the lamp unit is connected to the outputting connection member so that the lamp unit is unrotatable with respect to the outputting connection member, wherein the pinion gear is in meshing engagement with a rack provided on the support portion, and wherein the lamp unit is configured to tilt in an up-down direction, when the leveling motor rotates, the driving force of the leveling motor is transmitted to the rack through the pinion gear, and the outputting connection member moves with the main body portion in the front-rear direction with respect to the support portion wherein the outputting connection member includes a base portion and a connecting shaft portion, the base portion including a restricting portion that restricts a horizontal rotation of the outputting connection member relative to the lamp housing.

6. The vehicle headlamp according to claim 5, wherein the outputting connection member includes an engagement groove, and wherein the outputting connection member is unmovably fixed with respect to the disposing case by inserting the first supporting shaft into the engagement groove.

* * * * *